US006851909B2

(12) United States Patent
Campbell et al.

(10) Patent No.: US 6,851,909 B2
(45) Date of Patent: Feb. 8, 2005

(54) LATERAL CROSS-CABINET ACCESS FOR HORIZONTAL STORAGE LIBRARY

(75) Inventors: James P. Campbell, Mead, CO (US); Timothy C. Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 396 days.

(21) Appl. No.: 10/034,299

(22) Filed: Dec. 28, 2001

(65) Prior Publication Data

US 2003/0123300 A1 Jul. 3, 2003

(51) Int. Cl.[7] ................................................. B65G 1/00
(52) U.S. Cl. ........................ 414/268; 414/266; 414/282
(58) Field of Search ................................ 414/268, 266, 414/278, 282

(56) References Cited

U.S. PATENT DOCUMENTS

| | | | | |
|---|---|---|---|---|
| 4,850,783 A | * | 7/1989 | Maekawa | 414/792.9 |
| 4,958,976 A | * | 9/1990 | Haueter | 414/331.01 |
| 5,468,110 A | * | 11/1995 | McDonald et al. | 414/273 |
| 5,478,183 A | * | 12/1995 | Savigny | 414/276 |
| 5,564,879 A | * | 10/1996 | Noguchi | 414/268 |
| 5,582,497 A | * | 12/1996 | Noguchi | 414/281 |
| 5,599,154 A | * | 2/1997 | Holscher et al. | 414/278 |
| 5,634,760 A | * | 6/1997 | Anderson et al. | 414/268 |
| 5,690,463 A | * | 11/1997 | Yoshie | 414/266 |
| 6,327,519 B1 | * | 12/2001 | Ostwald et al. | 700/245 |
| 6,416,270 B1 | * | 7/2002 | Steury et al. | 414/282 |

\* cited by examiner

Primary Examiner—Eileen D. Lillis
Assistant Examiner—Thuy V. Tran
(74) Attorney, Agent, or Firm—Yee & Associates, P.C.

(57) ABSTRACT

A system for relocating elements within a storage library is provided, the library comprising plurality of adjacent horizontal arrays of storage cells and at least one robot that moves along the horizontal arrays and can retrieve objects from and place objects into the storage cells. The present invention comprises a cross-cabinet guide rail that is placed at the end of the adjacent horizontal arrays and serves as a means 1) to move media elements and robots between adjacent arrays of storage cells, 2) to provide an easy access method for the entry and removal of components from the library, and 3) to provide a method for movement of cartridges and robots between separate library enclosures.

20 Claims, 8 Drawing Sheets though as a preferred mode of use, further objectives and advantages thereof, will best be understood by reference to the following detailed description of an illustrative embodiment when read in conjunction with the accompanying drawings, wherein:

LATERAL CROSS-CABINET ACCESS FOR HORIZONTAL STORAGE LIBRARY

BACKGROUND OF THE INVENTION

1. Field of the Invention

The present invention relates generally to media storage libraries and more specifically to movement of stored objects between different library components.

2. Background of the Invention

Typical library designs require "cartridge access portholes" (CAPS) to load media and other components into the library enclosures. The libraries might also require a "pass through" mechanism for passing cartridges into adjacent library enclosures. A typical guide rail type library uses am elevator mechanism to shift media cartridges or robots between adjacent rows of track to gain full access to all of the media. These three concepts require hardware and software to provide the functions necessary in a large library system, which can be costly and subtracts from the system reliability and performance, also requiring room inside the library space.

Therefore, it would be desirable to have a system for moving media elements and components within and between library enclosures without subtracting from system performance or taking up significant space.

SUMMARY OF THE INVENTION

The present invention provides a system for relocating elements within a storage library, the library comprising plurality of adjacent horizontal arrays of storage cells and at least one robot that moves along the horizontal arrays and can retrieve objects from and place objects into the storage cells. The present invention comprises a cross-cabinet guide rail that is placed at the end of the adjacent horizontal arrays and serves as a means 1) to move media elements and robots between adjacent arrays of storage cells, 2) to provide an easy access method for the entry and removal of components from the library, and 3) to provide a method for movement of cartridges and robots between separate library enclosures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
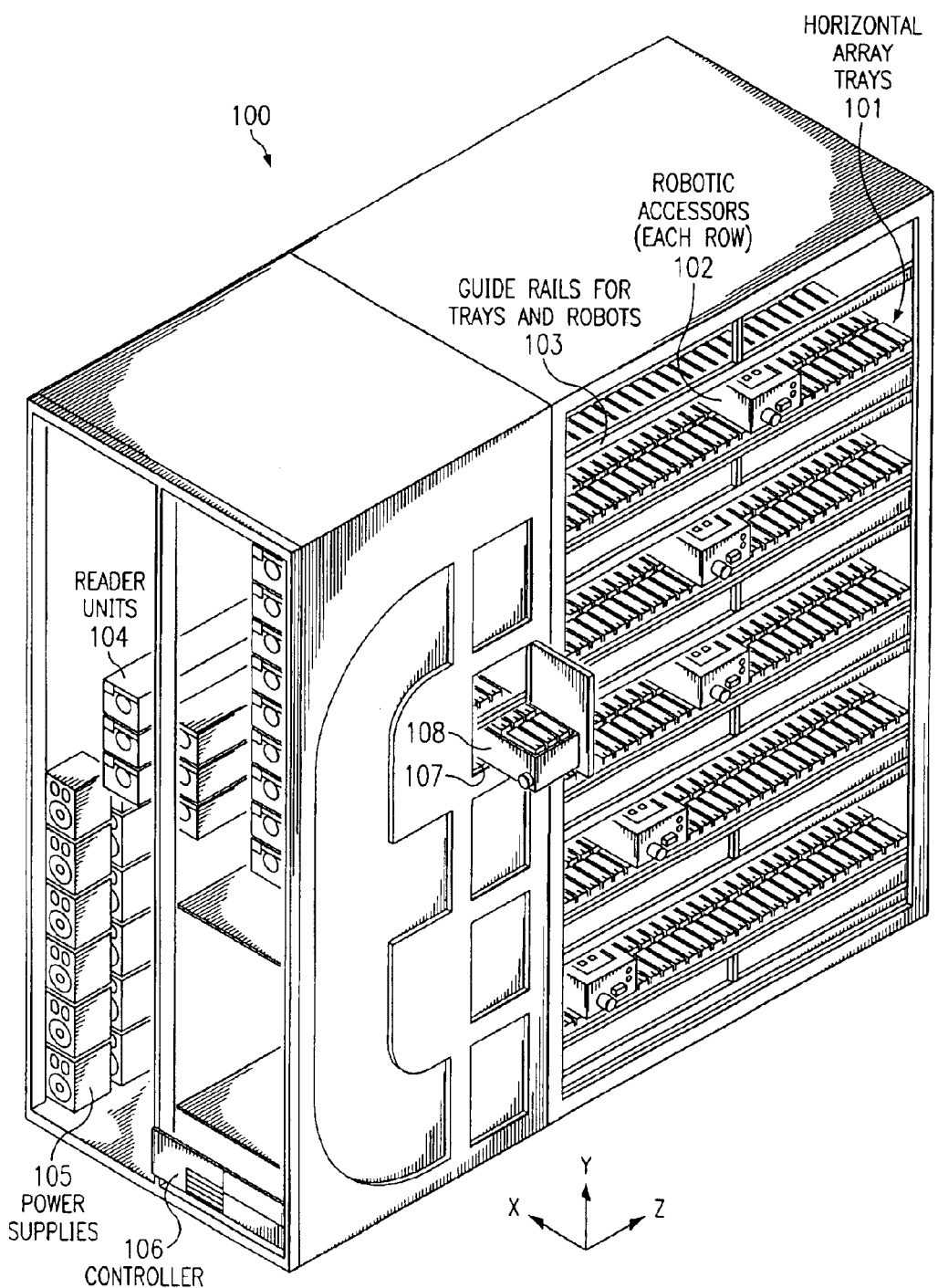
FIG. 1 depicts an isometric pictorial diagram illustrating a library unit with horizontal storage arrays in accordance with the present invention.

Referring to FIG. 1, an isometric pictorial diagram illustrating a library unit with horizontal storage arrays is depicted in accordance with the present invention. It should be pointed out that FIG. 1, as well as all of the figures discussed below, depicts the library system without side covers, so that the internal components may be viewed.

Library unit 100 represents the basic design from which larger horizontal library systems can be built. Media elements (i.e. cartridges) are stored in horizontal array trays, e.g., 101, which are arranged in multiple rows. The horizontal arrays are comprised of storage cells arranged horizontally in rows and columns. Media cartridges within the storage cells are retrieved and replaced vertically.

Robotic accessors, e.g., 102, utilized horizontal guide rails, e.g., 103, to move along the array trays 101 in order to access the media elements. The robots 102 use propulsion motors and drive wheels to move along the guide rails 103. The guide rails 103 may also be used to allow the horizontal array trays 101 to slide in and out of the enclosure of library unit 100. Alternatively, separate guide rails may be provided to facilitate removal of the storage cell trays 101.

Library unit 100 contains media reader units 104, power supply units 105, and a controller 106. FIG. 1 depicts an open cartridge access port (CAP) 107 and pass-through tray 108, which are included for each horizontal row in library system 100 and allow media cartridges to be passed between adjacent library units, as explained in detail below.

The typical prior art library is configured with vertical cartridge storage walls made up of storage cells arrayed in a vertical plane or curved wall. The storage cells in such a library may be removable to allow access into an enclosure. However, the media storage slots making up a storage wall are seldom deep enough to gain an advantage when removed; i.e. the removal of a wall does not create enough additional space for a human operator to fit through the narrow pathway.

The present invention of the horizontal array structure permits the storage density of a library to reach a new maximum limit, based on robot size, not human size. The horizontal array trays can be packed as closely together as robot height permits, without the need to leave room for a human operator to access components within the enclosure. An access isle can easily be created by removing some of the horizontal arrays, e.g., 101, to gain access (illustrated below).

Figure 2:
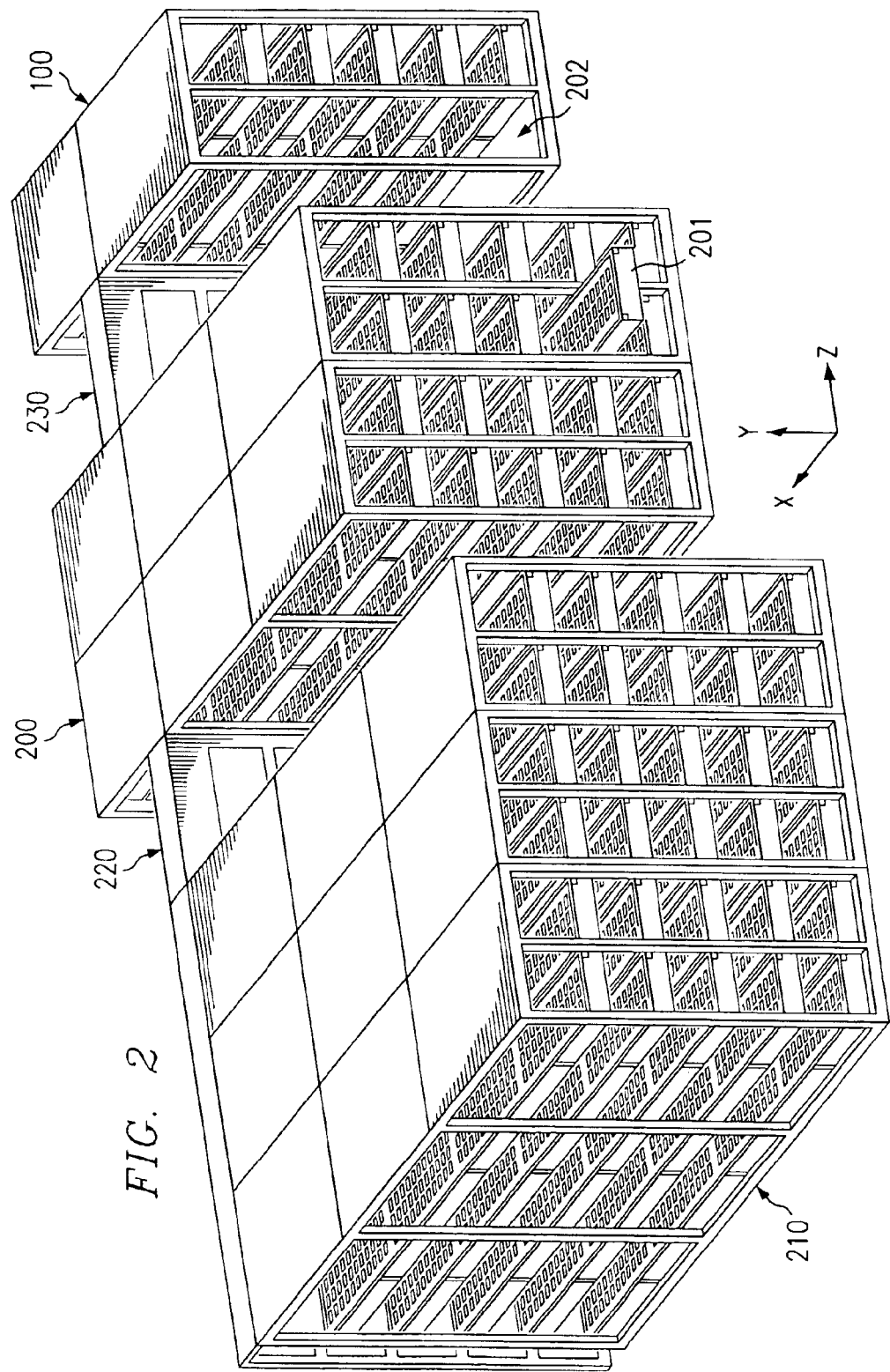
FIG. 2 depicts a front isometric view pictorial diagram illustrating the composite library system in accordance with the present invention.

Referring to FIG. 2, a front isometric view pictorial diagram illustrating the composite library system is depicted in accordance with the present invention. This composite library is comprised of library unit 100, depicted in FIG. 1, as well as two larger interconnected units 200 and 210. Library units 200 and 210 share the same basic horizontal layout as unit 100 but are larger.

The view depicted in FIG. 2 illustrates how human operators may access the storage elements and media readers within each of the library enclosures 100, 200, and 210 from the front side. The array tray support structure are designed with linear guide rails, e.g., guide rail 103 in FIG. 1, that allow an array tray to be removed from the library by simply sliding the tray outward (down the end of a guide rails) until the end of the rail is reached, thus allowing the tray to be completely removed from the library structure. Array tray 201 illustrates a tray that is partially withdrawn from library enclosure 200. Access space 202 illustrates how a service isle may be created when multiple array trays are completely removed from the library enclosure, as explained above. The horizontal configuration allows the design to take advantage of the storage array size to set the width of the pathway created when array packages are removed. For example, by creating a storage array tray of 16 cartridge slots, an isle width of 20 inches can be obtained between support structures for the array trays.

In addition to removing single trays, the array tray modules could be hooked together to form a group of trays, such that by pulling an endmost tray, all of the other trays connected to it would slide out to gain full access to all the trays. This process can be performed by an operator or possibly with automated electro-mechanical motors for large systems with many trays, e.g., enclosure 210.

FIG. 2 also depicts the housings for the pass-through mechanisms 220 and 230 that connect the three library enclosures 100, 200 and 210. The operation of these pass-through mechanisms 220 and 230 are discussed in more detail below.

Figure 3:
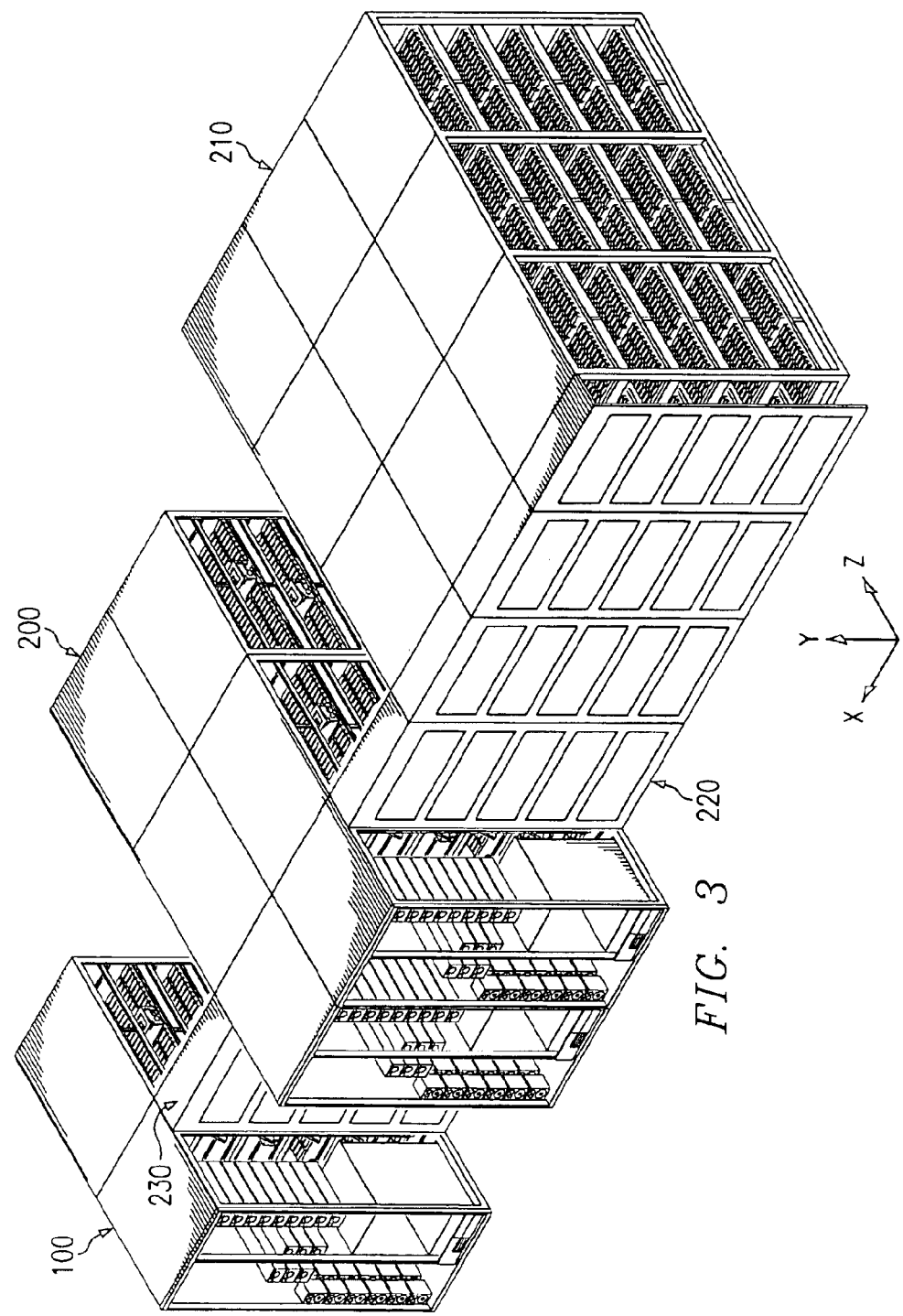
FIG. 3 depicts a rear isometric view pictorial diagram illustrating a composite library system in accordance with the present invention.

Referring to FIG. 3, a rear isometric view pictorial diagram illustrating a composite library system is depicted in accordance with the present invention. As can be seen from this angle, library unit 210 does not contain its own media readers. Cross-enclosure pass-through mechanisms 220 and 230 are able to transfer media cartridges from enclosure 210 to the appropriate media readers in enclosures 100 and 200.

With prior art vertical wall libraries, adding storage walls requires the robot accessors to have a path intersecting at a common "lobby" in front of the media readers, wherein paths intersect in orthogonal directions to reach the common area. These vertical designs require extra guide rails that may have to intersect to get the robots into the shared space in front of a tape reader unit.

For horizontal storage, capacity is added without having to join robot spaces in a common "lobby" near the tape reader units. The horizontal configuration of the present invention uses "cross tracks" within the pass-through mechanisms 220 and 230 to move cartridges between expansion units to get the tapes in front of the appropriate media reader.

Figure 4:
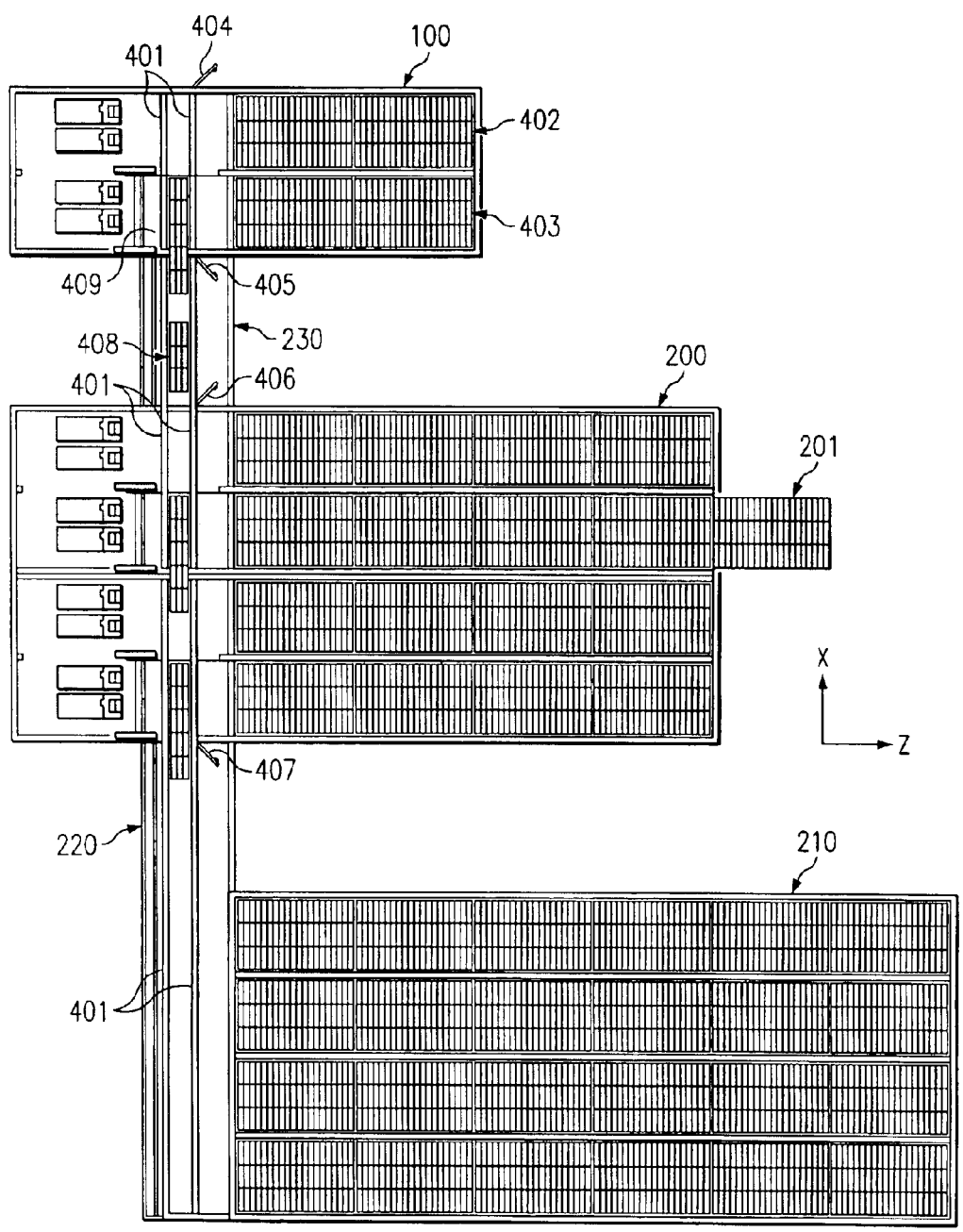
FIG. 4 depicts a top view pictorial diagram illustrating the composite library system in accordance with the present invention.

Referring to FIG. 4, a top view pictorial diagram illustrating the composite library system is depicted in accordance with the present invention. FIG. 4 more clearly illustrates the components of the pass-through mechanisms 220 and 230 and cross-cabinet guide rail 401.

The pass-through mechanisms 220 and 230 rely on a cross-cabinet (or across-the-cabinet) guide rail 401, which can move media cartridges (or robots themselves) against the grain of the normal robot flow. Cross-cabinet guide rails run through each horizontal row within the library enclosures 100, 200, and 210. (The cross-cabinet guide rails on the lower levels are more clearly illustrated in FIG. 8 below.)

The cross-cabinet guide rail 401 serves as a means 1) to get media in between adjacent banks of storage cells, 2) to provide an easy access method for cartridge entry into the library, and 3) to provide a method for movement of cartridges (or robots) between library enclosures.

For example, cross-cabinet guide rail 401 allows media cartridges and robots to move between adjacent storage cell banks 402 and 403. The ability to move between adjacent banks of storage arrays enables media cartridges to reach the correct media players, as well as be transferred to different storage array banks. The cross-cabinet guide rail 401 also enables a given number of robots to cover a larger number of storage cells, which can be important, depending on cost constraints and available resources. The media cartridges might be carried on the cross-cabinet rail 401 by either a robot or a motorized, cross-cabinet tray 409.

Cartridge access port (CAP) 404 on the outer side of enclosure 100 allows easy access for adding or removing media cartridges from enclosure 100. Additional CAPs 405, 406 and 407 are provided on each side of enclosures 100 and 200 to allow motorized cross-cabinet trays, e.g., 408 and 409, to pass completely through each side and carry cartridges between enclosures 100, 200, and 210. Through not pictured in FIG. 4, it should be pointed out that CAPs are placed on all horizontal levels within enclosures 100 and 200 (as illustrated in FIG. 1). Another embodiment comprises the movement of the robots between enclosures, using track joints and sub-rails, rather than cross-cabinet trays.

The cross-cabinet guide rails 401 allows media cartridges and robots from any of the enclosures 100, 200, or 210 to reach the outer CAP 404 on enclosure 100, which enables service personnel to add, remove or repair media cartridges, cross-cabinet trays and robots, without having to pull out horizontal array trays and create an access pathway, as described above.

The concept of pass-through between separate library enclosures is essentially the same as movement between adjacent banks within the same enclosure. The only significant difference is the presence of the enclosure walls. Pass-through between enclosures also serves the same functions as movement between banks (reaching the right media player, increased coverage per robot, etc.).

The cross-cabinet guide rail system, combined with the track switched described below, allows the robots in the horizontal library to move in three dimensions, whereas vertical wall library only allow robots to move in two directions (x and y).

The use of horizontal array structure permits the library to grow easily in two dimensions. Expanding a library can be accomplished by growing in the z direction (along the robot guide track) and/or growing sideways in the x direction (side-by-side accumulation of more storage tray rows). The library is limited in the Y direction by the room ceiling height.

Figure 5:
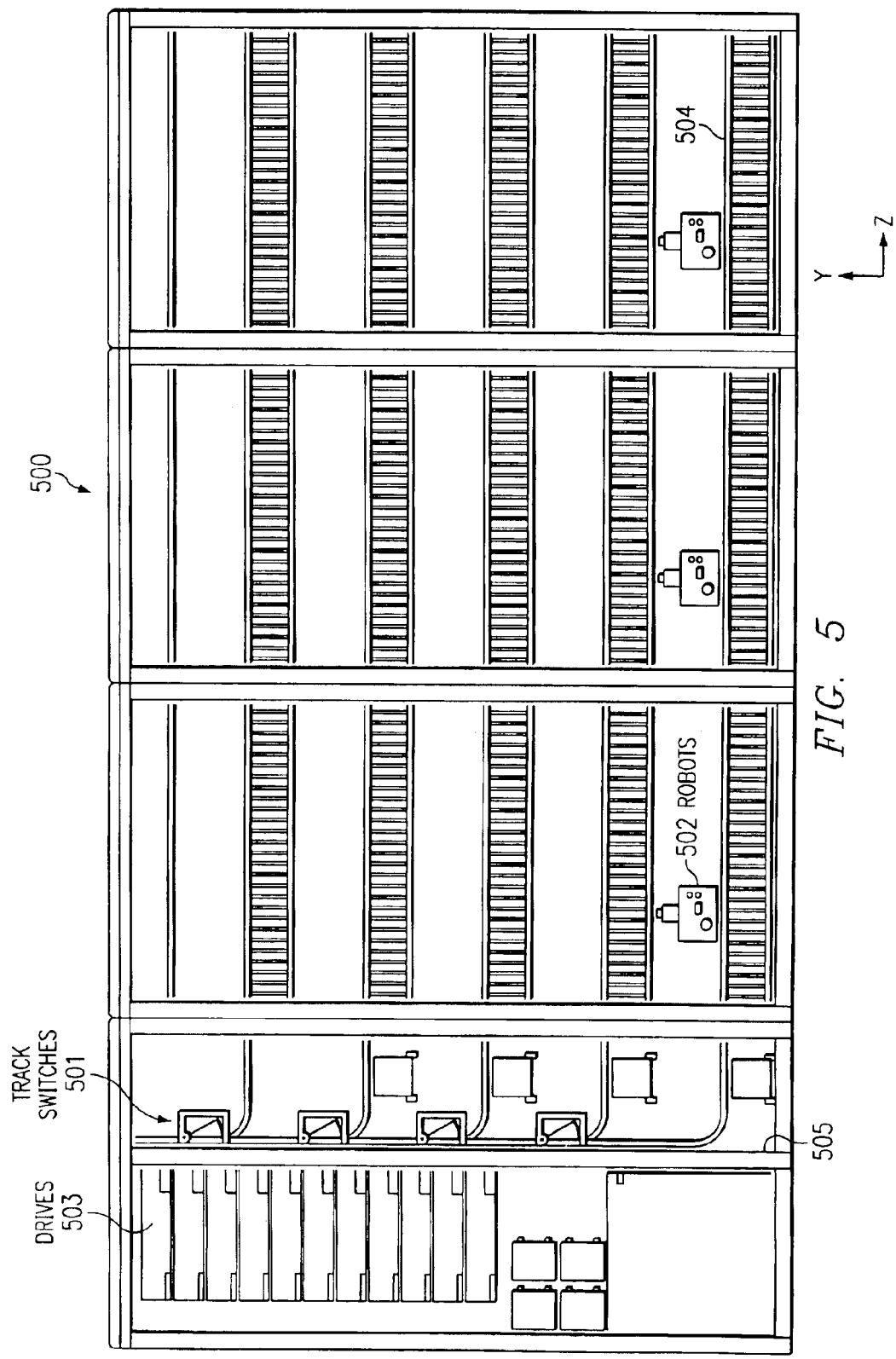
FIG. 5 depicts a cross-section, side view pictorial diagram illustrating a horizontal library unit in accordance with the present invention.

Referring to FIG. 5, a cross-section, side view pictorial diagram illustrating a horizontal library unit is depicted in accordance with the present invention. FIG. 5 illustrates how Robots, e.g., 502, are translated between different horizontal levels within the library. Guide track switches 501 at each level allow the robots 502 to switch between horizontal guide rails, e.g., 504, and a vertical guide rail 505. This enables robots 502 to move between different horizontal levels, as well as move between different media readers/drive 503, which are stacked vertically along vertical guide rail 505.

Figure 6:
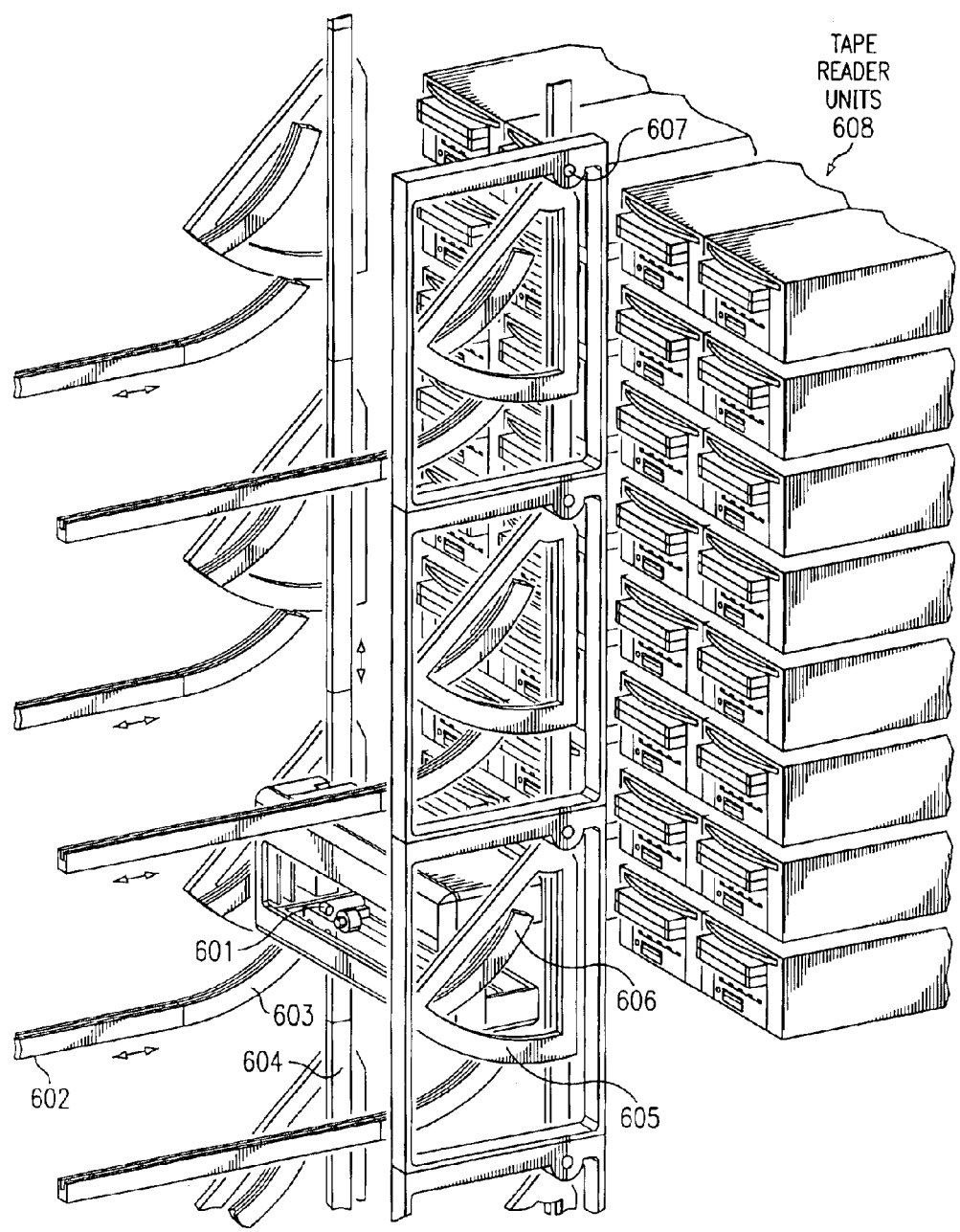
FIG. 6 depicts a pictorial diagram illustrating guide track switching mechanisms for each horizontal level in accordance with the present invention.

Referring to FIG. 6, a pictorial diagram illustrating guide track switching mechanisms for each horizontal level is depicted in accordance with the present invention. The embodiment of the track switch depicted in FIG. 6 uses a "Y" junction 605 wherein a motor or other actuator controls the position of a moving guide rail 606 around a pivot point 607. This allows the moving guide rail 606 to be aligned with a fixed curve track 603, thus allowing robot 601 to make the transition from the vertical rail 604 to the horizontal rail 602. The Y joint is an application of the "turntable joint" (round house) used in railroad examples. The mechanical working of the Y joint are described in more detail below.

Figure 7:
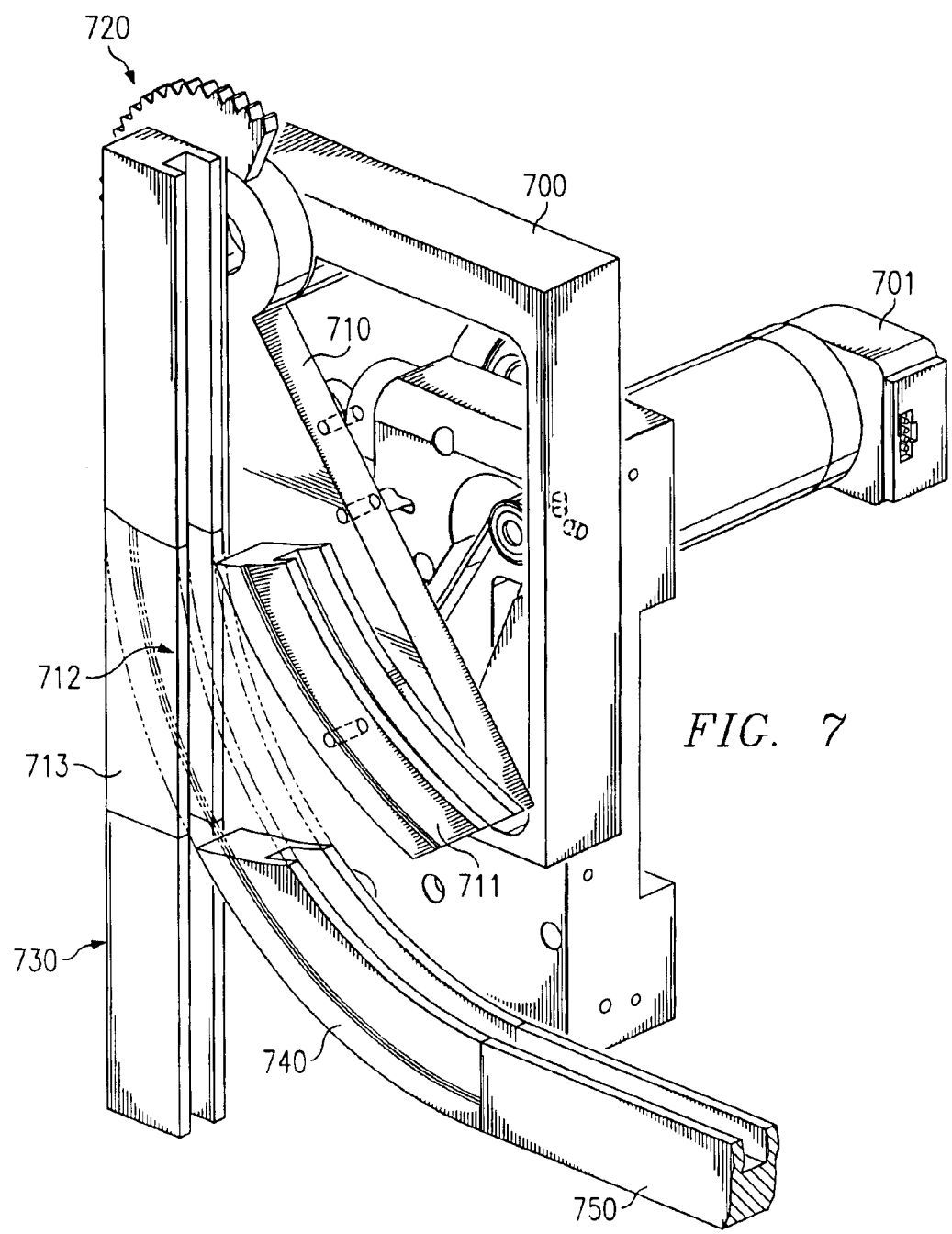
FIG. 7 depicts a pictorial diagram illustrating a Y joint in a track switch in accordance with the present invention.

Referring to FIG. 7, a pictorial diagram illustrating a Y joint in a track switch is depicted in accordance with the present invention. A partial robot structure 700 and robot propulsion motor 701 are illustrated attached to the guide rails. The Y joint 710 is moved by actuator gear 720 (motor not shown). The Y joint 710 has two partial rail sections: a straight section 713 and a curved section 711/712. The curved section of rail is shown in two different positions: disengaged 711, and engaged 712.

When the Y joint 710 is brought forward by the actuator gear 720, the curved rail section 711 is disengaged, and the straight section 713 is engaged with the vertical track 730. In this forward position, the robot 700 will continue to move along the vertical track 730.

When the Y joint 710 is brought backward by the actuator gear 720, the straight section 713 is disengaged, and the curved section 712 is engaged with the fixed curved rail 740. In this position, the robot 700 can move onto the horizontal guide rail 750.

Another embodiment of the track switch uses a "passive" Y joint, wherein a spring-loaded moving track section would let a robot pass through it to get on a fixed rail. If the robot comes back the other way, the moving section would be fixable to cause the robot to go onto only one of the rail sections of the Y track. This design effectively creates one-way traffic for the robots, because the robots can always be guided forward through the track switch, without returning over the same Y joint in the opposite direction.

Figure 8:
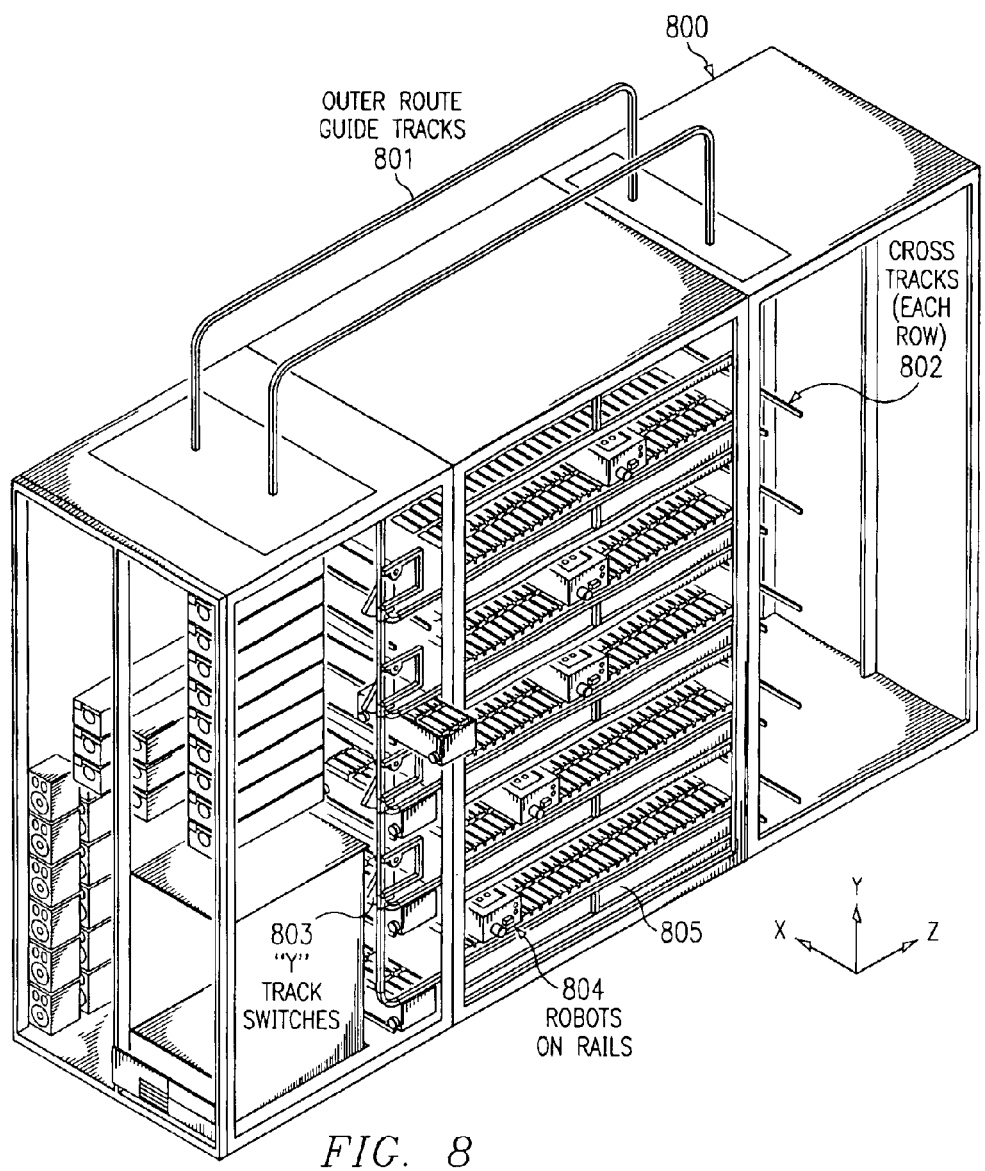
FIG. 8 depicts an isometric view pictorial diagram illustrating an outer route guide rail mechanism in accordance with the present invention.

Referring to FIG. 8, an isometric view pictorial diagram illustrating an outer route guide rail mechanism is depicted in accordance with the present invention. The horizontal library design allows for the addition of guide rail structures 801 that provide a path of travel for any of the robots 804 to move in a loop back to the far end of the structure 800. This provides a return path for continuous loading of data cartridges toward the tape reader units. The one-way robot traffic created by this approach limits robot contention and provides a constant stream of cartridge load jobs. Guide rail switches, e.g., 803, are implemented at both ends of the horizontal storage cell arrays, e.g., 805, to allow robots 804 to traverse up or down between horizontal rows.

A looping feed path is created by outer route layout, wherein a robot may be used in conjunction with another robot such that there is no contention between the robots. If the control software for the system is structured to force the movements of all robots to be in the same direction, and the robots can always loop forward to get to any desired position, then a state of operation can be achieved where no contention occurs between robots on the same track. The performance of the system is improved because a robot is made available to dismount a drive concurrent with the requested mount of the same drive.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A media library, comprising:

a first enclosure containing a first plurality of horizontal trays, said first plurality of horizontal trays containing a first array of media elements that are connected to be carried between said first plurality of horizontal trays and a plurality of media players by a first robot;

a second plurality of horizontal trays contained within a second enclosure, said second plurality of horizontal trays containing a second array of media elements that are connected to be carried between said second plurality of horizontal trays and said plurality of media players by a second robot, wherein said plurality of media players are contained in at least one of said first enclosure and said second enclosure; and a mechanism that carries media elements between said first enclosure and said second enclosure along a cross-enclosure guide rail.

2. The media library of claim 1, wherein said mechanism is a motorized tray, wherein said first robot and said second robot can add and remove media elements from said motorized tray.

3. The media library of claim 1, wherein said mechanism is one of said first robot and said second robot.

4. The media library of claim 1, wherein said first plurality of horizontal trays and said second plurality of horizontal trays are ranged in a vertical series of horizontal rows.

5. The media library according to claim 4, wherein a vertical space between the vertical series of horizontal rows is limited by a height of the at least one picker robot.

6. The media library according to claim 4, wherein said first robot and said second robot can move between ones of said vertical series of horizontal rows.

7. The media library according to claim 1, wherein said first array and said second array of storage elements are arranged in horizontal rows and columns.

8. The media library according to claim 1, said media elements are tapes and said media players are tape drives.

9. The media library according to claim 1, wherein said first and said second robots follow one-way paths so that no contention is created between said first and said second robots.

10. The media library according to claim 1, wherein said first and said second robots move along a set of guide rails.

11. The media library according to claim 1, wherein said first plurality and said second plurality of horizontal trays can be moved along a set of guide rails.

12. A media library comprising:

a plurality of robotic units configured to carry media units to and from a media player;

a plurality of media storage trays, each having an array of media elements that are inserted and removed vertically;

a plurality of storage units, each having a first pair of rails configured to carry ones of said plurality of media storage ways and a second pair of rails arranged to carry ones of said robotic units, said robotic units being configured to access ones of said media elements stored in said media storage trays;

a first enclosure that contains a first group of said plurality of storage units, which are arranged in rows and columns, and a first one of said plurality of robotic units;

a second enclosure that contains a second group of said plurality of storage units, which are arranged in rows and columns, and a second one of said plurality of robotic units; and a mechanism that carries ones of said plurality of media elements between said first enclosure and said second enclosure.

13. The media library of claim 12, wherein said mechanism is a motorized tray, wherein ones of said robotic units can add and remove cartridges from said motorized tray.

14. The media library of claim 12, wherein said mechanism is one of said robotic units.

15. The media library of claim 12, wherein a vertical space between ones of said storage units arranged in rows and columns is limited by the height of said robotic units.

16. The media library of claim 12, further comprising media players arranged to receive ones of said plurality of media elements carried by ones of said plurality of robotic units.

17. The media library of claim 12, wherein said media elements are tapes.

18. The media library of claim 12, wherein said plurality of robotic units can move between ones of said plurality of storage units.

19. The media library of claim 12, wherein said plurality of robotic units follow one-way paths so that no contention is created between said robotic units.

20. The media library of claim 12, wherein said first and said second first pair of rails in ones of said storage units are the same pair of rails.

* * * * *